United States Patent
Florea et al.

(10) Patent No.: US 10,415,505 B2
(45) Date of Patent: Sep. 17, 2019

(54) NON-AXISYMMETRIC FAN FLOW PATH

(71) Applicant: United Technologies Corporation, Farmington, CT (US)

(72) Inventors: Razvan Virgil Florea, Manchester, CT (US); Thomas G. Tillman, West Hartford, CT (US); William T. Cousins, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 762 days.

(21) Appl. No.: 14/911,577

(22) PCT Filed: Apr. 17, 2014

(86) PCT No.: PCT/US2014/034494
§ 371 (c)(1),
(2) Date: Feb. 11, 2016

(87) PCT Pub. No.: WO2015/023325
PCT Pub. Date: Feb. 19, 2015

(65) Prior Publication Data
US 2016/0186690 A1    Jun. 30, 2016

Related U.S. Application Data

(60) Provisional application No. 61/864,700, filed on Aug. 12, 2013.

(51) Int. Cl.
*F02C 7/04* (2006.01)
*F02K 3/06* (2006.01)
(Continued)

(52) U.S. Cl.
CPC ............ *F02K 3/06* (2013.01); *F01D 5/143* (2013.01); *F01D 5/145* (2013.01); *F01D 5/20* (2013.01);
(Continued)

(58) Field of Classification Search
CPC ...... F02K 3/06; F02C 7/04; F02C 7/42; B64D 2033/0226; B64D 2033/0286; B64D 33/02; F05D 2270/17; F05D 2250/51
See application file for complete search history.

(56) References Cited

U.S. PATENT DOCUMENTS 2,650,752 A     9/1953 Hoadley
3,575,259 A *   4/1971 Wilkinson ............ F02C 7/045
                                              137/15.1
(Continued)

FOREIGN PATENT DOCUMENTS

CA      2181106 A1    1/1997
EP      1126132 A2    8/2001
(Continued)

OTHER PUBLICATIONS

English Abstract for FR2986046A1—Jul. 26, 2013; 2 pgs.
(Continued)

*Primary Examiner* — Gerald L Sung
*Assistant Examiner* — Christopher M Adams
(74) *Attorney, Agent, or Firm* — Cantor Colburn LLP

(57) ABSTRACT

A gas turbine engine propulsion system and method of assembling such is disclosed. The gas turbine engine propulsion system comprises a gas turbine engine that includes a fan flow path. The fan flow path may extend from the fan inlet to the rear exhaust outlet of the bypass flow path. A portion of the fan flow path, proximal to the fan, is non-axisymmetric. The non-axisymmetric portion may be upstream or downstream of the fan.

12 Claims, 11 Drawing Sheets

(51) Int. Cl.
    *F01D 5/14*     (2006.01)
    *F01D 5/20*     (2006.01)
    *F02C 7/045*     (2006.01)
    *F04D 29/52*     (2006.01)
    *F04D 27/02*     (2006.01)
    *F04D 29/32*     (2006.01)
    *F04D 29/54*     (2006.01)
    *F02C 3/04*     (2006.01)

(52) U.S. Cl.
    CPC ............... *F02C 3/04* (2013.01); *F02C 7/04* (2013.01); *F02C 7/045* (2013.01); *F04D 27/0246* (2013.01); *F04D 29/321* (2013.01); *F04D 29/526* (2013.01); *F04D 29/547* (2013.01); *F05D 2220/32* (2013.01); *F05D 2220/36* (2013.01); *F05D 2250/184* (2013.01); *F05D 2250/61* (2013.01); *F05D 2250/73* (2013.01); *F05D 2270/102* (2013.01); *Y02T 50/673* (2013.01)

(56) References Cited

U.S. PATENT DOCUMENTS

| | | | | |
|---|---|---|---|---|
| 3,890,060 | A * | 6/1975 | Lipstein | F04D 29/664 |
| | | | | 415/119 |
| 4,066,214 | A * | 1/1978 | Johnson | B64D 33/04 |
| | | | | 239/265.19 |
| 4,786,016 | A * | 11/1988 | Presz, Jr. | B63B 3/38 |
| | | | | 138/37 |
| 5,369,954 | A * | 12/1994 | Stuart | B64D 29/00 |
| | | | | 239/265.17 |
| 5,642,985 | A | 7/1997 | Spear et al. | |
| 6,195,983 | B1 | 3/2001 | Wadia et al. | |
| 6,561,761 | B1 | 5/2003 | Decker et al. | |
| 6,655,632 | B1 * | 12/2003 | Gupta | B64C 23/06 |
| | | | | 244/1 N |
| 2003/0084936 | A1 * | 5/2003 | Surply | B64D 33/02 |
| | | | | 137/15.1 |
| 2005/0274103 | A1 * | 12/2005 | Prasad | B64D 33/02 |
| | | | | 60/226.1 |
| 2007/0224038 | A1 | 9/2007 | Solomon et al. | |
| 2009/0010754 | A1 * | 1/2009 | Kumar | F01D 25/16 |
| | | | | 415/173.1 |
| 2011/0236200 | A1 | 9/2011 | Grover et al. | |
| 2012/0014776 | A1 | 1/2012 | Fulayter et al. | |
| 2015/0360790 | A1 * | 12/2015 | Rouyre | B64D 33/02 |
| | | | | 244/53 B |
| 2015/0369127 | A1 * | 12/2015 | Gilson | F01D 25/24 |
| | | | | 415/119 |
| 2018/0043997 | A1 * | 2/2018 | Ramakrishnan | B64C 21/06 |

FOREIGN PATENT DOCUMENTS

| | | |
|---|---|---|
| EP | 1382799 A2 | 1/2004 |
| EP | 1988266 A2 | 11/2008 |
| FR | 2986046 A1 | 7/2013 |
| JP | 2012026361 A | 2/2012 |

OTHER PUBLICATIONS

English Abstrast for JP2012026361A—Feb. 9, 2012; 1 pg.
European Search Report for Application No. 14836522.4-1607; dated Feb. 22, 2017; 8 pgs.
International Search Report for Application No. PCT/US2014/034494.
Written Opinion for Application No. PCT/US2014/034494.

* cited by examiner

NON-AXISYMMETRIC FAN FLOW PATH

STATEMENT REGARDING FEDERALLY SPONSORED RESEARCH AND DEVELOPMENT

This invention was made in part with Government support under Contract Number NNC07CB59C awarded by NASA. The Government may have certain rights in this invention.

TECHNICAL FIELD

This disclosure relates to the design of a gas turbine engine with increased stability margin in the presence of ingested boundary layer flow distortion.

BACKGROUND

Gas turbine engines are known, and typically include a fan delivering air into a bypass duct, and into a compressor. The air in the compressor is compressed and passed into a combustion section where it is mixed with fuel and ignited. Products of this combustion pass downstream over turbine rotors, driving them to rotate. The turbine rotors in turn drive the fan and compressor rotors.

Gas turbine engines having a fan as described above are typically utilized to drive aircraft. Boundary layer flow from the aircraft frame may cause distortion to the air flow ingested by the gas turbine engine. For example, such distortion of ingested flow may occur during take-off, landing, and in lateral wind conditions. It would be beneficial to provide a flow path around the fan that increases the stability margin associated with inlet total pressure and swirl distortions driven by static pressure non-uniformity and ingested voracity.

SUMMARY OF THE DISCLOSURE

In accordance with one aspect of the disclosure, a gas turbine engine is disclosed. The engine may comprise a compressor, a turbine, a fan including a plurality of blades rotatable about the axis, a core case that extends rearward from the fan along the axis and generally surrounds the compressor and the turbine, a fan case that generally surrounds the fan blades and a portion of the core case, a bypass flow path disposed downstream of the fan between the outer surface of the core case and the inner surface of the fan case, and a fan flow path. The core case includes an outer surface, a core inlet and a core flow path disposed within the core case. The core flow path is configured to receive airflow from the fan and to convey the airflow to the compressor. The core inlet is disposed at the entrance to the core flow path. The fan case includes a fan inlet and an inner surface. The fan inlet is disposed upstream of the fan blades. The bypass flow path is configured to receive air drawn in by the fan through the fan inlet and to convey bypass airflow from the fan rearward. The fan flow path extends from the fan inlet to the rear exhaust outlet of the bypass flow path. A portion of the fan flow path proximal to the fan is non-axisymmetric with respect to the axis.

In an embodiment, the inner surface of the fan case in an upper half of the bypass flow path may include a perturbation that is disposed downstream of the fan and that extends toward the core case opposite to the perturbation. The perturbation may have generally sloping sides and a generally rounded peak. In a refinement, the transverse width of the perturbation may be defined by an angle in a range of about 5° to about 40°. In the refinement, the angle has a vertex disposed on the axis. In a further refinement, a height of the peak of the perturbation may be about 0.1 to about 0.25 of the transverse width of the perturbation.

In another embodiment, an axial length of the perturbation is about half of a blade axial chord to about twice the blade axial chord. In another embodiment, a height of the peak of the perturbation may be about 1 percent to about 3 percent of a blade axial chord.

In another embodiment, the outer surface of the core case may include a perturbation that is disposed in an upper half of the fan flow path downstream of the fan and before the core inlet, and extends toward the fan case opposite to the perturbation. The perturbation may have generally sloping sides and a generally rounded peak. In a refinement, a transverse width of the perturbation may be defined by an angle in a range of about 5° to about 100°. The angle may have a vertex disposed on the axis.

In yet another embodiment, the outer surface of the core case in a lower half of the fan flow path may include a perturbation that is disposed downstream of the fan and before the core inlet, and extends inward. The perturbation may have generally sloping sides and a generally rounded trough.

In another embodiment, the fan may include an inlet cone disposed before the blades. The inlet cone may include a perturbation disposed in the upper half of the inlet cone. The perturbation may have a generally smooth finish and extend outward. The perturbation may include generally sloping sides and a generally rounded peak.

In another embodiment, the inner surface of the fan case may include a spoiler that is disposed downstream of the fan. The spoiler is moveable between a closed position and an open position in which the spoiler extends into the bypass flow path at a spoiler angle. In one embodiment, the spoiler angle may be in the range of about 5° to about 40°.

In another embodiment, the outer surface of the core case may include a spoiler that is disposed downstream of the fan and before the core inlet. The spoiler is moveable between a closed position and an open position in which the spoiler extends into the bypass flow path at a spoiler angle. The spoiler angle may be in the range of about 5° to about 60°.

In another embodiment, the inner surface of the fan case may include a wavy portion that is disposed in the bottom half of the fan flow path upstream of and proximal to the fan. The wavy portion may include a generally sinusoidal wave profile having a plurality of peaks and troughs. Each peak may be disposed at an angle to the circumference to the fan inlet. In a refinement, a portion of the fan case immediately following the wavy portion may be axisymmetric.

In another embodiment, each of the plurality of fan blades has a tip and the fan case includes a first rub strip and a second rub strip mounted on the inner surface of the fan case. The first rub strip is disposed in the upper half of the fan flow path proximal to a first tip and the second rub strip is disposed in the lower half of the fan flow path proximal to a second tip.

In another embodiment, the inner surface of the fan case may include tubing configured to convey fluid around a portion of the circumference of the fan flow path.

In accordance with another aspect of the disclosure, a gas turbine disposed about a longitudinal axis is disclosed. The engine may comprise a compressor, a turbine, a fan including a plurality of blades rotatable about the axis, a core case that extends rearward from the fan along the axis and generally surrounds the compressor and the turbine, a fan case that generally surrounds the fan and a portion of the core case, and a bypass flow path. The core case includes an outer surface and a core flow path disposed within the core case. The core flow path is configured to receive airflow from the fan and to convey the airflow to the compressor. The fan case includes a fan inlet and an inner surface. The fan inlet is disposed upstream of the fan blades and configured to receive airflow drawn in by the fan. The bypass flow path is disposed downstream of the fan between the outer surface of the core case and the inner surface of the fan case. The bypass flow path is configured to receive air drawn in by the fan through the fan inlet and to convey bypass airflow from the fan rearward. The inner surface of the fan case and the outer surface of the core case is proximal to the fan is non-axisymmetric with respect to the axis. In one embodiment, the inner surface of the fan case may include a first perturbation, and the outer surface of the core case may include a second perturbation. In a refinement, the outer surface of the core case may include a third perturbation. The third perturbation may be a recess.

In accordance with one aspect of the disclosure, a method of assembling a gas turbine propulsion system is disclosed. The method may comprise defining a fan flow path by positioning a fan case around a fan and a portion of a core case of a gas turbine engine, the inner surface of the fan case and the outer surface of the core case defining a bypass flow path, the bypass flow path disposed downstream of the fan and configured to receive air drawn in by the fan and to convey bypass airflow from the fan rearward, the fan flow path extending from an entrance to the fan case disposed before the fan to the end of the bypass flow path. At least a portion of the fan flow path is non-axisymmetric immediately before or after the fan.

DETAILED DESCRIPTION

Figure 1:
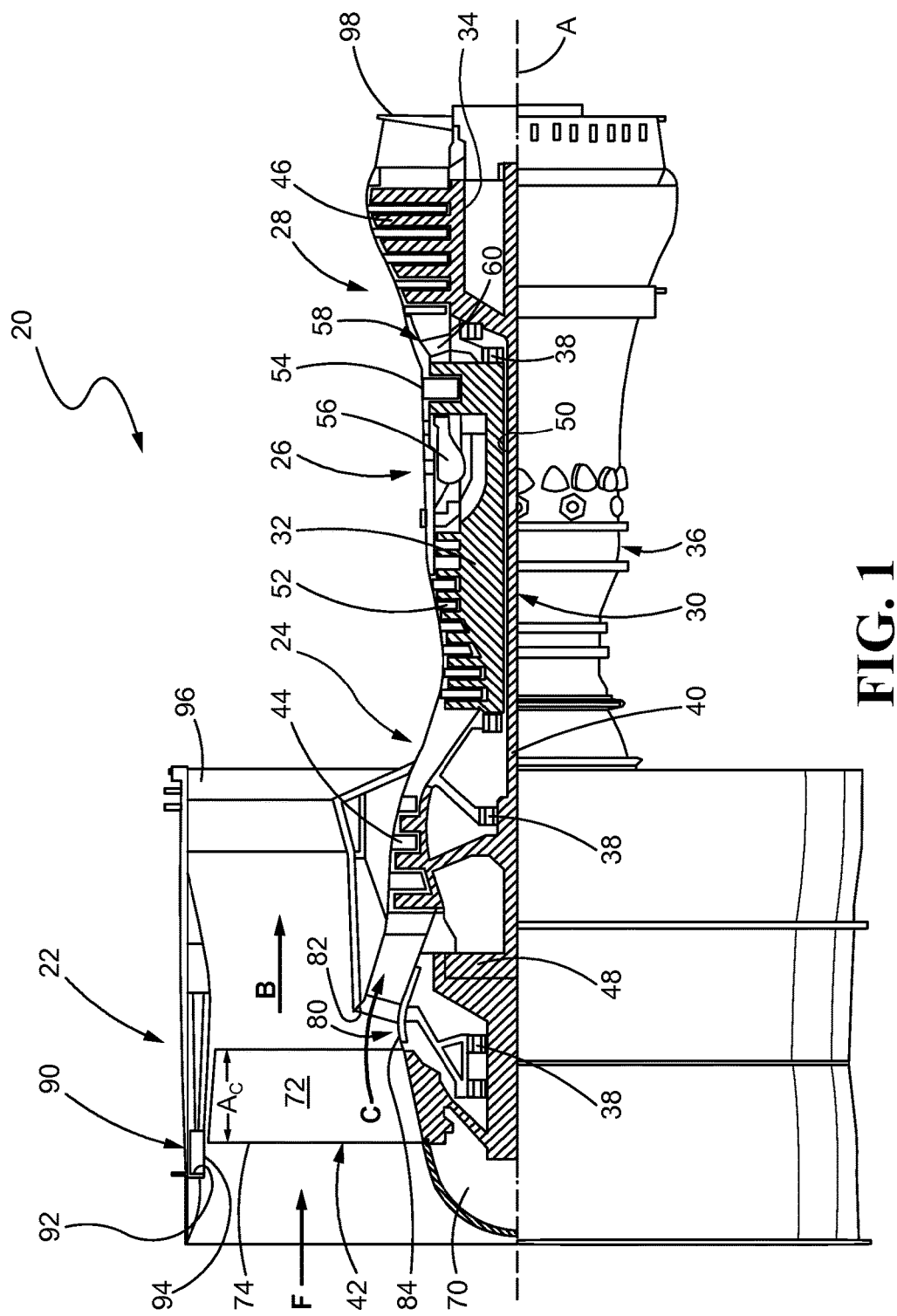
FIG. 1 illustrates cut-away view of selected portions of an exemplary gas turbine propulsion system including a gas turbine engine.

FIG. 1 schematically illustrates an exemplary gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The fan includes an inlet cone 70, and a plurality of blades 72 rotatable about the engine central longitudinal axis A. Each blade includes a leading edge 74, as that term is known in the art. The width across each blade 72 may be referred to as the axial chord, $A_C$, of the blade. The inlet cone 70 is disposed before the fan blades 72, and is sometimes commonly referred to as the fan center. In some embodiments, the inlet cone 70 may be stationary and in other embodiment, the inlet cone 70 may be moveable.

The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow traveling along the core flow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core flow path C and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The gas turbine engine 20 includes a core case 80 that generally surrounds the compressors 44, 52, the combustor 56 and the turbines 46, 54. The core case 80 extends rearward from the fan 42 along the engine central longitudinal axis A to the aft end of the engine. The core case 80 defines a core inlet 82 located at the entrance to the core flow path C disposed within the core case 80. The core flow path C extends longitudinally through the core case 80 and is configured to receive a portion of the airflow from the fan 42, through the core inlet 82, and to convey the airflow to the compressor. The core case 80 includes an outer surface 84.

The fan section 22 includes a fan case 90 that provides an outer housing that extends around the fan blades 72 and a portion of the core case 80. In some embodiments, the fan case 90 may also extend around the inlet cone 70. The fan case 90 defines a fan inlet 92 disposed before (upstream of) the fan blades 72. The fan case 90 also includes an inner surface 94. The bypass flow path B is disposed downstream of the fan 42 and is defined as between the inner surface 94 of the fan case 90 and (the portion of) the outer surface 84 of the core case 80 (that is surrounded by the fan case 90). The bypass flow path B is configured to receive airflow from the fan 42 and to convey the airflow rearward to a rear exhaust outlet 96 disposed at the rear end of the fan case 90.

The fan flow path F extends from the fan inlet 92 to the rear exhaust outlet 96 at the end of the bypass flow path B. In embodiments where the inlet cone 70 is disposed outside of the fan case 90, the fan flow path F starts proximal to the inlet cone 70. In the embodiments illustrated herein, a portion of the fan flow path F is non-axisymmetric proximal to the fan 72. More specifically, the fan flow path F may be non-axisymmetric upstream of the fan 42, downstream of the fan 42, or both. In some embodiments, the portion of the fan flow path F immediately opposite the fan blades 72 may also be non-axisymmetric.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }°R)/(518.7°R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades 72. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

The use of the gear reduction between the low speed spool 30 and the fan 42 allows an increase of speed to the low pressure compressor 44. In the past, the speed of the low pressure turbine 46 and the low pressure compressor 44 has been somewhat limited in that the fan speed cannot be unduly large. The maximum fan speed is at its outer tip, and in larger engines, the fan diameter is much larger than it may be in smaller power engines. However, the use of the gear reduction has freed the designer from limitation on the speeds of the low pressure turbine 46 and the low pressure compressor 44 speeds caused partially by a desire to not have unduly high fan speeds.

As discussed above, the fan flow path F, in the embodiments herein, is non-axisymmetric about the central longitudinal axis A in the area proximal to the fan 42. The design of this non-axisymmetric fan flow path F increases the stability margin associated with inlet total pressure and swirl distortions driven by static pressure non-uniformity and ingested vorticity. Such a non-axisymmetric fan flow path F may be used to radially redistribute the aerodynamic loading in the fan flow path F near the outer surface 84 of the core case 80 and/or the inner surface 94 of the fan case 90.

Figure 2:
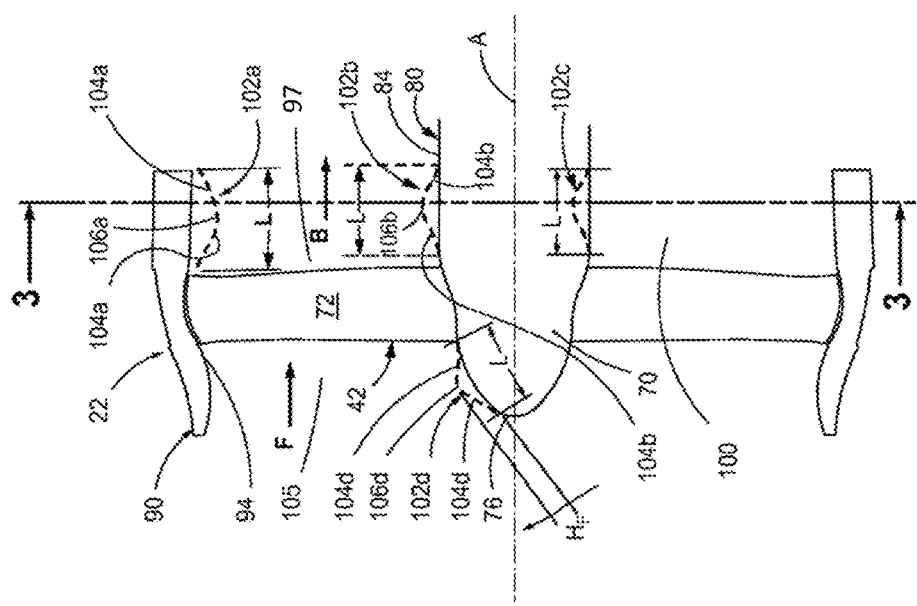
FIG. 2 diagrammatically illustrates an enlarged portion of the fan section of the gas turbine engine of FIG. 1 in accordance with the teachings of this disclosure.
Figure 3:
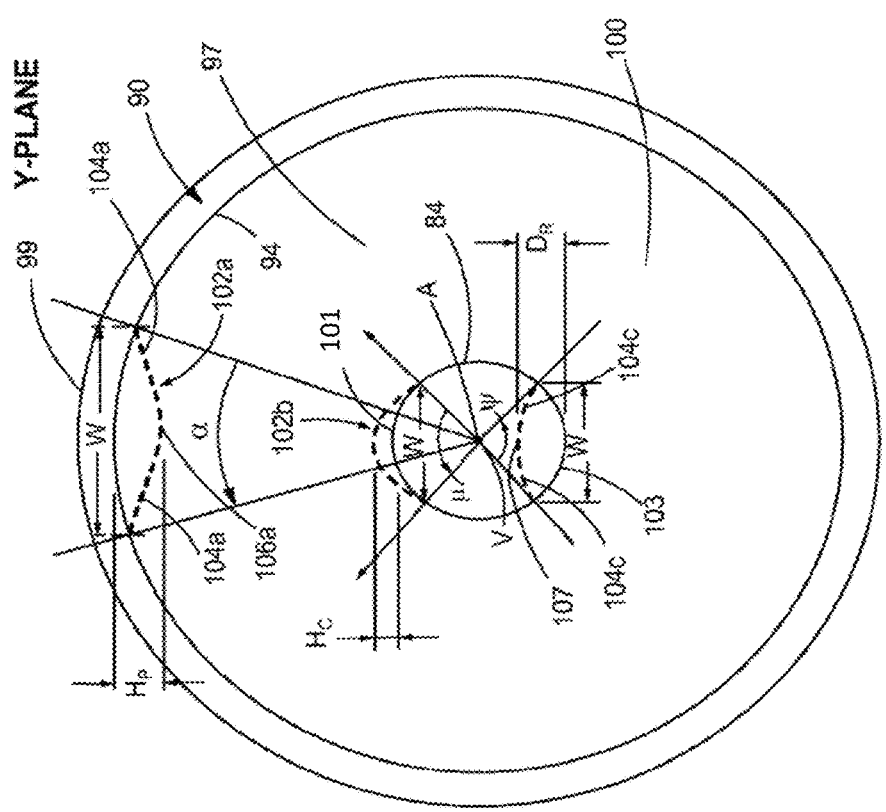
FIG. 3 diagrammatically illustrates a sectional view of the fan case and core case taken along the lines 3-3 of FIG. 2.

Turning now to FIG. 2, therein is diagrammatically illustrated an enlarged portion of the fan section 22 of the gas turbine engine 20 of FIG. 1 with exemplary contouring of the (inner and outer) circumference of fan flow path F provided by contouring of the inner surface 94 of the fan case 90, the outer surface 84 of the core case 80 between the fan 72 and the entrance to the core flow path C, and/or the outer surface of the inlet cone 70. As can be seen in FIG. 2, when so contoured the fan flow path F may include one or more perturbations 102 that, alone or in combination, result in the fan flow path F being non-axisymmetric about the central longitudinal axis A. These perturbations 102 help create favorable pressure gradients either upstream or downstream of the fan blades that lead to reduction in incoming pressure and/or radial distortion. In FIG. 2 elements of the engine except for a portion of the fan case 90, the core case 80, the inlet cone 70, the fan blades 72 and the exemplary perturbations 102 have been removed to better illustrate the perturbations 102. FIG. 3 diagrammatically illustrates a sectional view of the fan case 90 and core case 80 taken along the lines 3-3 of FIG. 2.

As shown in FIGS. 2-3, the inner surface 94 of the fan case 90 may include a perturbation 102a that extends into the bypass flow path B and toward the core case 80. The perturbation 102a has generally sloping sides 104a and a generally rounded peak 106a (top) and may be thought of as a portion of a long wavelength sinusoidal wave. Because the perturbation 102a extends outward into the bypass flow path B some may refer to the perturbation 102a as generally convex in shape. In some embodiments, the perturbation 102a may have a generally smooth surface finish.

The perturbation 102a may be disposed after the fan blades 72 in the upper half 97 of the bypass flow path B. In one embodiment, the perturbation 102a is disposed in the bypass flow path B before (upstream of) the core inlet 82 (FIG. 1) on the core case 80. In some embodiments, the perturbation 102a (FIGS. 2-3) may be generally centered at the top of the bypass flow path B. In other embodiments, the perturbation 102a may be centered elsewhere on a point located in the upper half 97 of the bypass flow path B. Such positioning creates a local flow area reduction.

The axial length L of the perturbation 102a may be in the range of about a half of the axial chord $A_C$ of the fan blade 72 to about twice the axial chord $A_C$ of the fan blade 72. The axial length L of the perturbation 102a is measured from the starting point of the perturbation 102a to the ending point of the perturbation, fore to aft in a direction extending along the longitudinal axis A. The "axial chord" $A_C$ of the blade 72 is the width across the blade 72 taken at the tip 78 of the blade 72.

As seen in FIG. 3, the transverse width W across the perturbation 102a of the fan case inner surface 94 is defined by an angle α. The angle α may have a value in a range of about 5° to about 40°. In another embodiment, the transverse width W may be defined by the angle α having a value in a range of about 10° to about 30°. The angle α having a vertex V disposed on the center longitudinal axis A, and its mouth generally disposed on the circumference or perimeter of the inner surface 94 of the fan case 90 cross section (as shown in FIG. 3). The angle α is in the Y-plane shown in FIG. 3. The transverse width W across the perturbation 102a may be thought of as spanning or covering the arc length 99 of the angle α, although the transverse width W is measured in a generally straight line from a first side to the opposing second side at the base of the perturbation 102a as illustrated in FIG. 3.

In an embodiment, the height $H_P$ of the peak 106a of the perturbation 102a may be in a range of about 0.1 to about 0.25 of the transverse width W of the perturbation 102a. In another embodiment, the height $H_P$ of the peak 106a of the perturbation 102a may be in a range of about 1 percent to about 3 percent of the axial chord $A_C$ of the blade 72.

As shown in FIGS. 2-3, the outer surface 84 of the core case 80 may include a perturbation 102b that is disposed in the bypass flow path B downstream of the fan 42 and before the core inlet 82 (FIG. 1). The perturbation 102b (FIGS. 2-3) extends into the bypass flow path B toward the fan case 90 opposite to the perturbation 102b. The perturbation 102b has generally sloping sides 104b and a generally rounded peak 106b and may be thought of as a portion of a long wavelength sinusoidal wave. Because the perturbation 102b extends outward into the bypass flow path B, some may refer to the perturbation 102b as generally convex in shape. In some embodiments, the perturbation 102b may have a generally smooth surface finish.

The perturbation 102b may be disposed in the upper half 97 of the bypass flow path B. In some embodiments the perturbation 102b may be generally centered at the top of the core case 80. In other embodiments, the perturbation 102b may be centered on another point elsewhere on the core case 80 in the upper half 97 of the bypass flow path B. Such positioning creates a local flow area reduction.

The axial length L of the perturbation 102b is in the range of about a half of the axial chord $A_C$ of a fan blade 72 to about twice the axial chord $A_C$ of the fan blade 72. The axial length L of the perturbation 102b is measured from the starting point of the perturbation 102b to the ending point of the perturbation 102b, in a fore to aft direction extending along the longitudinal axis A.

As seen in FIG. 3, the transverse width W across the perturbation 102b disposed on the core case outer surface 84 is defined by an angle μ. The angle μ may have a value in a range of about 5° to about 100°. In another embodiment, the transverse width W may be defined by an angle μ having a value in the range of about 10° to about 30°. The angle μ having a vertex V disposed on the center longitudinal axis A and its mouth generally disposed on the circumference or perimeter of the core case 80 cross section (as shown in FIG. 3). The angle μ is in the Y-plane shown in FIG. 3. The transverse width W across the perturbation 102b may be thought of as spanning or covering the arc length 101 of the angle μ, although the transverse width W is measured in a generally straight line from a first side to the opposing second side at the base of the perturbation 102b as illustrated in FIG. 3.

In an embodiment, the height $H_C$ of the peak 106b of the perturbation 102b may be in a range of about 0.1 to about 0.25 of the transverse width W of the perturbation 102b. In another embodiment, the height $H_C$ of the peak 106b of the perturbation 102b may be in a range of about 1 percent to about 3 percent of the axial chord $A_C$ of the blade 72.

As shown in FIGS. 2-3, the outer surface of the core case 80 may include a perturbation 102c that is disposed downstream of the fan 42 and before the core inlet 82 (FIG. 1) and is a recess that extends into the core case 80. The perturbation 102c generally has sloping sides 104c and a generally rounded trough 107 at the lowest point of the recess. Because the perturbation 102c extends inward into core case 80, some may refer to the perturbation as generally concave in shape. In some embodiments, the perturbation 102c may have a generally smooth surface finish.

In the embodiment, this perturbation may be disposed after the fan blades 72 in the lower half of the core case 80 and the lower half 100 of the bypass flow path B. In some embodiments the perturbation 102c may be generally centered at the bottom of the core case 80 in the lower half 100 of the bypass flow path B. In other embodiments, the perturbation 102c may be centered elsewhere on a point located in the lower half of the bypass flow path B. Such positioning creates a local flow area increase.

The axial length L of the perturbation 102c may be in the range of about a half of the axial chord $A_C$ of the fan blade 72 to about twice the axial chord $A_C$ of the fan blade 72. The axial length L of the perturbation 102c is measured from the starting point of the perturbation 102c to the ending point of the perturbation 102c, in a fore to aft direction extending along the longitudinal axis A.

As seen in FIG. 3, the transverse width W across the perturbation 102c of the core case outer surface 94 is defined by an angle ψ. The angle ψ may have a value in a range of about 5° to about 40°. In another embodiment, the transverse width W may be defined by an angle ψ having a value in a range of about 10° to about 30°. The angle ψ having a vertex V disposed on the center longitudinal axis A and its mouth generally disposed on the perimeter of the core case 80 cross-section (as shown in FIG. 3). The angle ψ is in the Y-plane shown in FIG. 3. The transverse width W across the perturbation 102c may be thought of as spanning or covering the arc length 103 of the angle ψ, although the transverse width W is measured in a generally straight line from a first side to the opposing second side at the base of the perturbation 102c as illustrated in FIG. 3.

In an embodiment, the depth $D_R$ of the trough of the perturbation 102c may be in a range of about 0.1 to about 0.25 of the transverse width W of the perturbation 102c. In another embodiment, the depth $D_R$ of the trough of the perturbation 102c is in a range of about 1 percent to about 3 percent of the axial chord $A_C$ of the blade 72.

As shown in FIG. 2, the outer surface 76 of the inlet cone 70 may include a perturbation 102d. The perturbation 102d on the inlet cone 70 may extend outward. In one embodiment, the perturbation 102d may be disposed in the upper half of the inlet cone 70. The perturbation 102d includes generally sloping sides 104d and a generally rounded peak 106d and may be thought of as a portion of a long wavelength sinusoidal wave. Because the perturbation 102d extends outward, some may refer to the perturbation 102d as generally convex in shape. In some embodiments, the perturbation 102d may have a generally smooth surface finish.

In one embodiment, the perturbation 102d may be disposed before the fan blades 72 in the upper half 105 of the fan flow path F. In some embodiments, the perturbation 102d may be generally centered on the top of the inlet cone 70. In other embodiments, the perturbation 102d may be centered elsewhere on the upper half of the inlet cone 70. Such positioning creates a local flow area reduction.

The axial length L of the perturbation 102d may be in the range of about a half of the axial chord $A_C$ of the fan blade 72 to about twice the axial chord $A_C$ of the fan blade 72. The axial length L of the perturbation 102d is measured from the starting point of the perturbation 102d to the ending point of the perturbation 102d, in a fore to aft direction.

In an embodiment, the height $H_F$ of the peak 106d of the perturbation 102d may be in a range of about 1 percent to about 3 percent of the axial chord $A_C$ of the blade 72.

Figure 4:
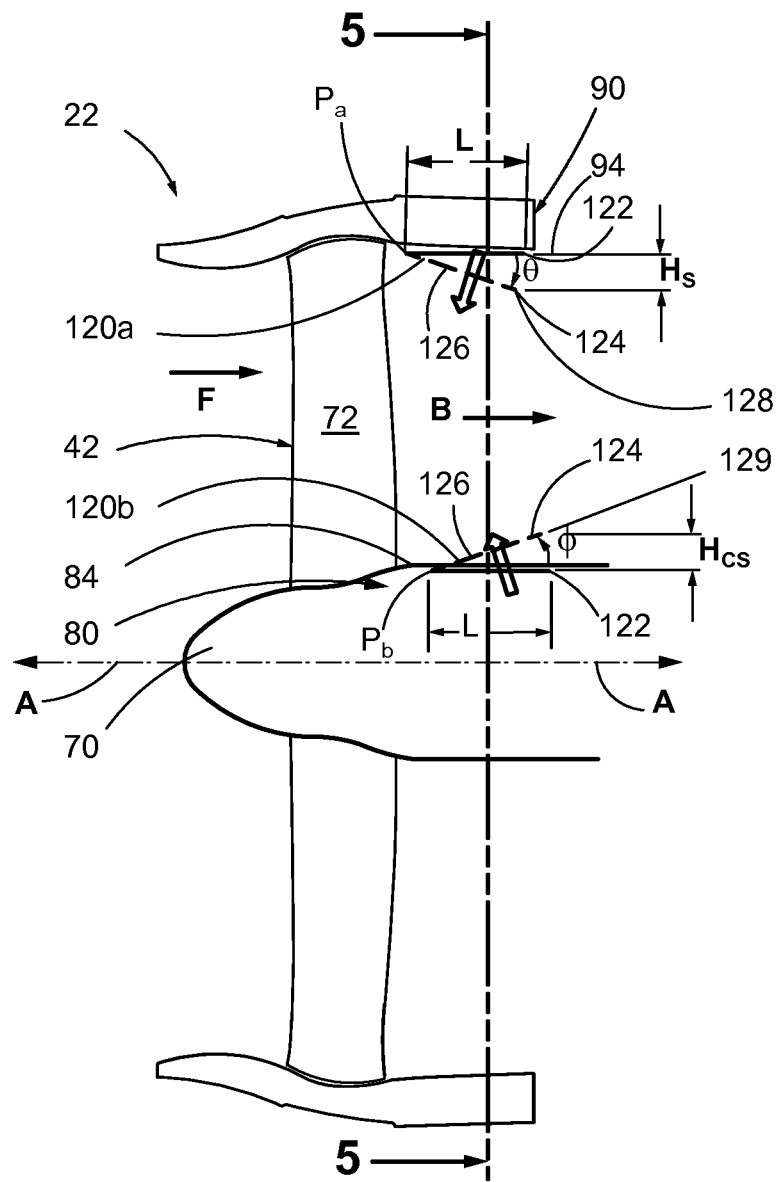
FIG. 4 diagrammatically illustrates an enlarged an enlarged portion of the fan section of the gas turbine engine of FIG. 1.
Figure 5:
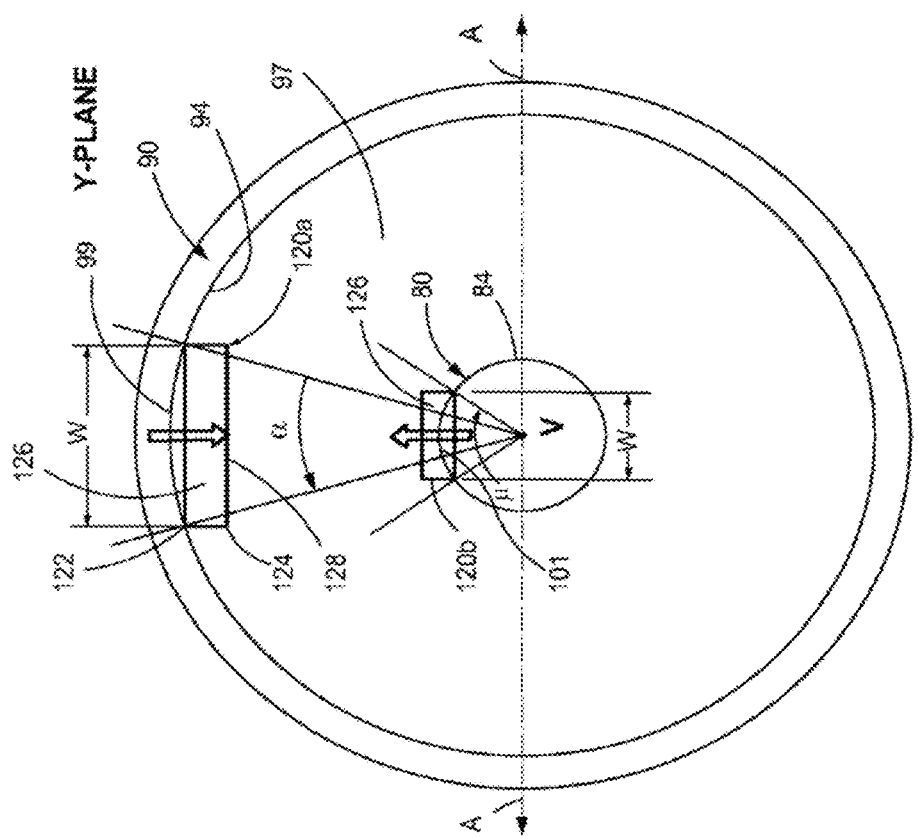
FIG. 5 diagrammatically illustrates a sectional view of the fan case and core case taken along the lines 5-5 of FIG. 4.

Turning now to FIG. 4, therein is diagrammatically illustrated an enlarged portion of the fan section 22 of the gas turbine engine 20 of FIG. 1 with exemplary contouring of the (inner and outer) circumference of fan flow path F provided by active or dynamic contouring of the inner surface 94 of the fan case 90, and the outer surface 84 of the core case 80. As can be seen in FIG. 4, when so contoured, the fan flow path F may include one or more spoilers 120 that, alone or in combination, result in the fan flow path F being dynamically non-axisymmetric about the central longitudinal axis A. These spoilers 120 help create favorable pressure gradients downstream of the fan blades 72 that lead to reduction in incoming pressure and/or vertical distortion. In FIG. 4, elements of the engine 20 except for a portion of the fan case 90, the core case 80, the inlet cone 70, the fan blades 72 and the exemplary spoilers 120 have been removed to better illustrate the spoilers 120. FIG. 5 diagrammatically illustrates a sectional view of the fan case 90 and core case 80 taken along the lines 5-5 of FIG. 4.

As shown in FIGS. 4-5, the im1er surface 94 of the fan case 90 may include a spoiler 120a disposed downstream of the fan 42. In one embodiment, the spoiler 120a may be disposed before the core inlet 82 (FIG. 1) on the core case 80. In some embodiments, the spoiler 120a (FIGS. 4-5) may be generally centered at the top of the bypass flow path B. In other embodiments, the spoiler 120a may be centered elsewhere on a point located in the upper half 97 of the bypass flow path B. Such positioning and structure of the spoiler 120a in the activated state (open position) creates a local flow area reduction in the bypass flow path B.

The spoiler 120a is pivotally moveable about a pivot point $P_a$ on the fan case 90 between a first position and a second position. For example, the first position may be a closed position 122 generally parallel to the central longitudinal axis A and the second position may be an open position 124. FIG. 4 illustrates the spoiler 120a in a closed position 122 and in an open position 124 (hatched lines). In one embodiment, activation of the spoiler 120a to the second position results in a generally sloping face 126 of the spoiler 120a protruding or extending into the bypass flow path B at a spoiler angle θ, as illustrated in FIG. 4. The vertex of the angle θ is disposed on the pivot point $P_a$. In the closed position 122, angle θ is about zero degrees. In an actuated state or open position 124, angle θ, in one embodiment, may be in the range of greater than zero to about 40°. In another embodiment, when the spoiler 120a is in an actuated state or open position 124, angle θ may be in the range of greater than zero to about 30°.

In one embodiment, the spoiler 120a may pivot the face 126 in a direction toward the fan blades 72 as illustrated in FIG. 4. In some embodiments, the spoiler 120a may be moveable to intermediate positions between the fully closed position 122 and a fully open position. One example of an embodiment of the spoiler 120 may be a flap rotatable about a hinged pivot point $P_a$. In a different embodiment, the inner surface 94 of the fan case 90 may morph dynamically to create a spoiler 120 when desired. In such an embodiment, the spoiler 120 may generally resemble a wedge or other appropriate shape.

Spoiler 120a activation may be based on measured or estimated parameters. An example of such a parameter is the airflow speed in the bypass flow path B, the pressure rise across the fan, or the distribution of pressure in the circumferential direction along the fan case 90 behind the fan rotor. Estimated airflow may be based on flight conditions correlated to estimated airflow in the bypass flow path B.

The axial length L of the spoiler 120a may be in the range of about a half of the axial chord $A_C$ of the fan blade 72 to about twice the axial chord $A_C$ of the fan blade 72. The axial length L of the spoiler 120a is measured from the pivot point $P_a$ of the spoiler 120a to the ending point of the spoiler 120a (at the opposite end of the spoiler 120a) in the closed position 122, fore to aft in a direction extending along the longitudinal axis A.

As seen in FIG. 5, the transverse width W across the spoiler 120a of the fan case inner surface 94 is defined by an angle α. The angle α may have a value in a range of about 5° to about 40°. In another embodiment, the transverse width W may be defined by the angle α having a value in a range of about 10° to about 30°. The angle α having a vertex V disposed on the center longitudinal axis A, and its mouth generally disposed on the circumference or perimeter of the inner surface 94 of the fan case 90 cross section (as shown in FIG. 5). The angle α is in the Y-plane shown in FIG. 5. The transverse width W across the spoiler 120a may be thought of as spanning or covering the arc length 99 of the angle α, although the transverse width W is measured in a generally straight line from a first side to the opposing second side of the spoiler 120a in a closed position 122 as illustrated in FIG. 5.

In an embodiment, the height $H_S$ of the spoiler 120a in the open position 124 may be in a range of about 0.1 to about 0.25 of the transverse width W of the spoiler 120a. In another embodiment, the height $H_S$ of the spoiler 120a is in a range of about 1 percent to about 3 percent of the axial chord $A_C$ of the blade 72. The height $H_S$ of the spoiler 120a is the perpendicular distance from the closed position 122 of the spoiler 120a to the edge 128 of the spoiler 120a in the open position 124.

As shown in FIGS. 4-5, the outer surface 84 of the core case 80 may include a spoiler 120b that is disposed in the bypass flow path B downstream of the fan 42 and before the core inlet 82 (FIG. 1). In some embodiments, the spoiler 120b (FIGS. 4-5) may be generally centered on the top of the core case 80. In other embodiments, the spoiler 120b may be centered elsewhere on a point located on the core case 80 in the upper half 97 of the bypass flow path B. Such positioning and structure of the spoiler 120b in the activated state (open position) creates a local flow area reduction in the bypass flow path B.

The spoiler 120b is pivotally moveable about a pivot point $P_b$ on the core case 80 between a first position and a second position. For example, the first position may be a closed position 122 generally parallel to the central longitudinal axis A and the second position may be an open position 124. FIG. 4 illustrates the spoiler 120b in a closed position 122 and in an open position 124 (hatched lines). In one embodiment, activation of the spoiler 120b to the second position results in a generally sloping face 126 of the spoiler 120b protruding or extending into the bypass flow path B at a spoiler angle Φ, as illustrated in FIG. 4. The vertex of the angle Φ is disposed on the pivot point $P_b$. In the closed position 122, angle Φ is about zero degrees. In an actuated state or open position 124, angle Φ, in one embodiment, may be in the range of greater than zero to about 40°. In another embodiment, when the spoiler 120b is in an actuated state or open position 124, angle Φ may be in the range of greater than zero to about 30°.

In one embodiment, the spoiler 120b may pivot the face 126 in a direction toward the fan blades 72 as illustrated in FIG. 4. In some embodiments, the spoiler 120b may be moveable to intermediate positions between the fully closed position 122 and a fully open position. One example of an embodiment of the spoiler 120 may be a flap rotatable about a hinged pivot point $P_b$. In a different embodiment, the outer surface 94 of the core case 80 may morph dynamically to create a spoiler 120b when desired. In such an embodiment, the spoiler 120b may generally resemble a wedge or other appropriate shape.

Spoiler 120b activation may be based on measured or estimated parameters. An example of such a parameter is the airflow speed in the bypass flow path B, the pressure rise across the fan, or the distribution of pressure in the circumferential direction along the fan case 90 behind the fan rotor. Estimated airflow may be based on flight conditions correlated to estimated airflow in the bypass flow path B.

The axial length L of the spoiler 120b may be in the range of about a half of the axial chord $A_C$ of the fan blade 72 to about twice the axial chord $A_C$ of the fan blade 72. The axial length L of the spoiler 120b is measured from the pivot point $P_b$ of the spoiler 120b to the ending point of the spoiler 120a (at the opposite end of the spoiler 120b) in the closed position 122, fore to aft in a direction extending along the longitudinal axis A.

As seen in FIG. 5, the transverse width W across the spoiler 120b of the core case outer surface 84 is defined by an angle μ. The angle μ may have a value in a range of about 5° to about 60°. In another embodiment, the transverse width W may be defined by the angle μ having a value in a range of about 10° to about 30°. The angle μ having a vertex V disposed on the center longitudinal axis A, and its mouth generally disposed on the circumference or perimeter of the outer surface 84 of the core case 80 cross section (as shown in FIG. 5). The angle μ is in the Y-plane shown in FIG. 5. The transverse width W across the spoiler 120b may be thought of as spanning or covering the arc length 101 of the angle μ, although the transverse width W is measured in a generally straight line from a first side to the opposing second side of the spoiler 120b in a closed position 122 as illustrated in FIG. 5.

In an embodiment, the height $H_{CS}$ of the spoiler 120b in the open position 124 may be in a range of about 0.1 to about 0.25 of the transverse width W of the spoiler 120b. In another embodiment, the height $H_{CS}$ of the spoiler 120b is in a range of about 1 percent to about 3 percent of the axial chord $A_C$ of the blade 72. The height $H_{CS}$ of the spoiler 120b is the perpendicular distance from the closed position 122 of the spoiler 120b to the edge 129 of the spoiler 120b in the open position 124.

Figure 6:
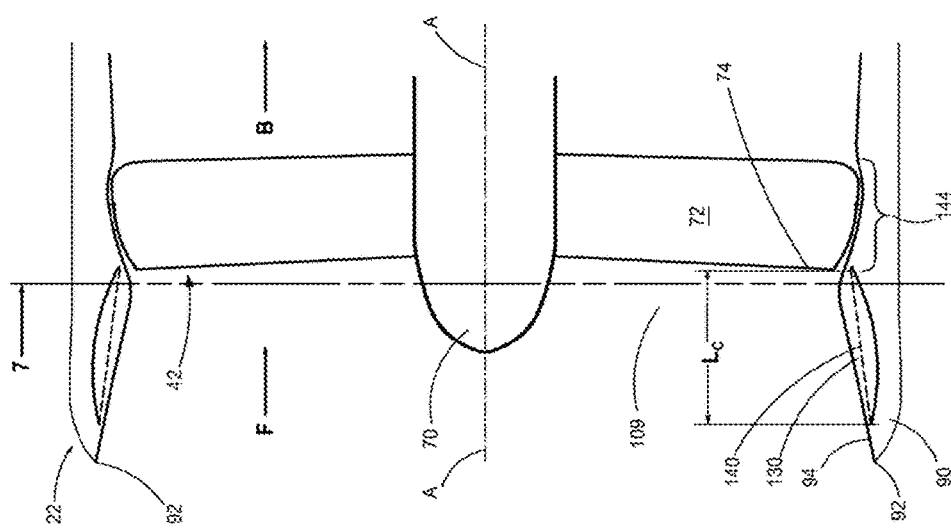
FIG. 6 diagrammatically illustrates an enlarged portion of the fan section of the gas turbine engine of FIG. 1.
Figure 7:
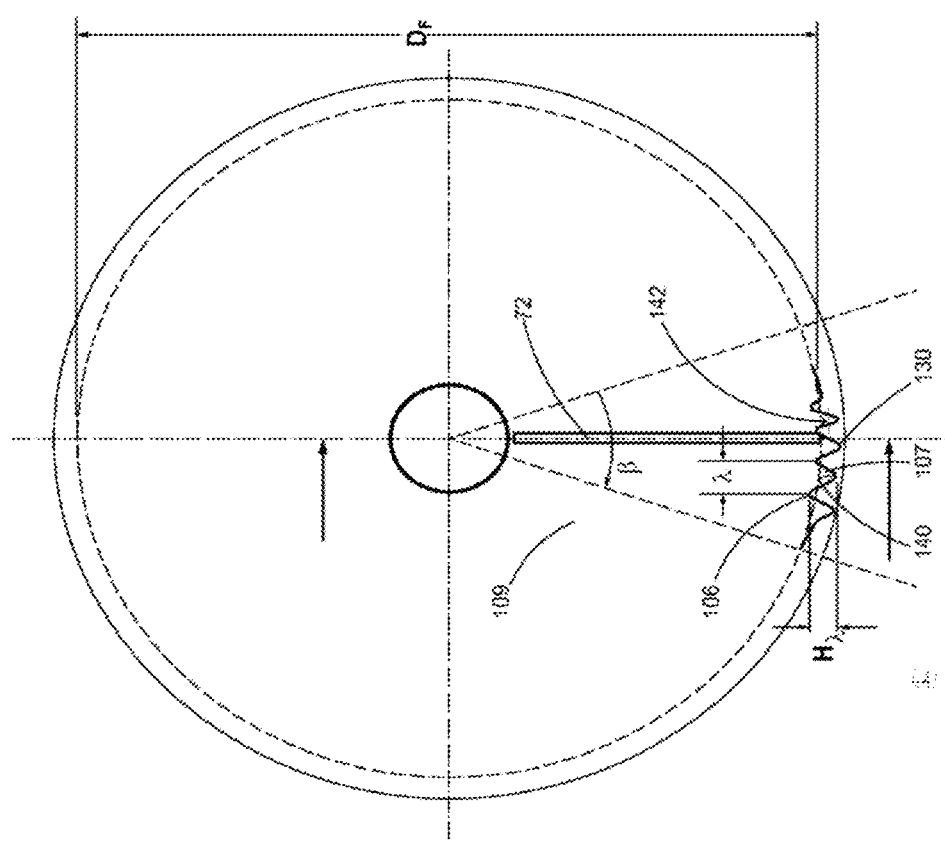
FIG. 7 diagrammatically illustrates a sectional view of the fan case and core case taken along the lines 7-7 of FIG. 6.

Turning now to FIG. 6, therein is diagrammatically illustrated an enlarged portion of the fan section 22 of the gas turbine engine 20 of FIG. 1 with exemplary contouring of the outer circumference of fan flow path F provided by contouring of the inner surface 94 of the fan case 90. FIG. 7 diagrammatically illustrates a sectional view of the fan case 90 and core case 80 taken along the lines 7-7 of FIG. 6. In FIGS. 6-7, elements of the engine 20 except for a portion of the fan case 90, the core case 80, the inlet cone 70, the fan blades 72 and an exemplary wavy portion 130 have been removed to better illustrate the exemplary wavy portion 130 described below. As can be seen in FIG. 7, when so contoured the fan flow path F may include one or more wavy portions 130 that result in the fan flow path F being non-axisymmetric about the central longitudinal axis A. The wavy portion 130 helps to increase the fan tip region stability and pre-rotate the airflow in the fan flow path F before the fan 42. Pre-rotation of the air causes a reduction in the fan incidence angle and thus provides greater fan aerodynamic stability.

As shown in FIGS. 6-7, the inner surface 94 of the fan case 90 may include a wavy portion 130 having a generally sinusoidal wave profile of a plurality of peaks 106 and troughs 107. In an embodiment, the wavy portion 130 may be disposed upstream of and immediately proximal to the fan 42. In one embodiment, the wavy portion 130 may start upstream of the fan blades 72 and end at approximately the leading edge 74 of the blades 72. The wavy portion 130 may be disposed in areas of the fan case 90 which are typically areas of low pressure that result from distortion of the fan airflow flowing into the fan 42. In some embodiments, the wavy portion 130 may have a generally smooth surface finish.

The location of the wavy portion 130 on the circumference of the fan case 90 may vary. In general, beneficial results may be maximized by centering the wavy portion 130 on the location of highest distortion in the fan flow path F (before the fan blades 72). In one embodiment, the wavy portion 130 may be centered on a point in the lower half 109 of the fan flow path F before the fan blades 72. For example, the wavy portion 130 may be generally centered in the fan case at the bottom of the fan flow path F as shown in FIGS. 6-7. The span of the wavy portion 130 on the circumference or perimeter of the fan inlet 92 is defined by an angle β. In one embodiment, the angle β may have a value in the range of about 20° to about 90° of the fan inlet 92.

Figure 8:
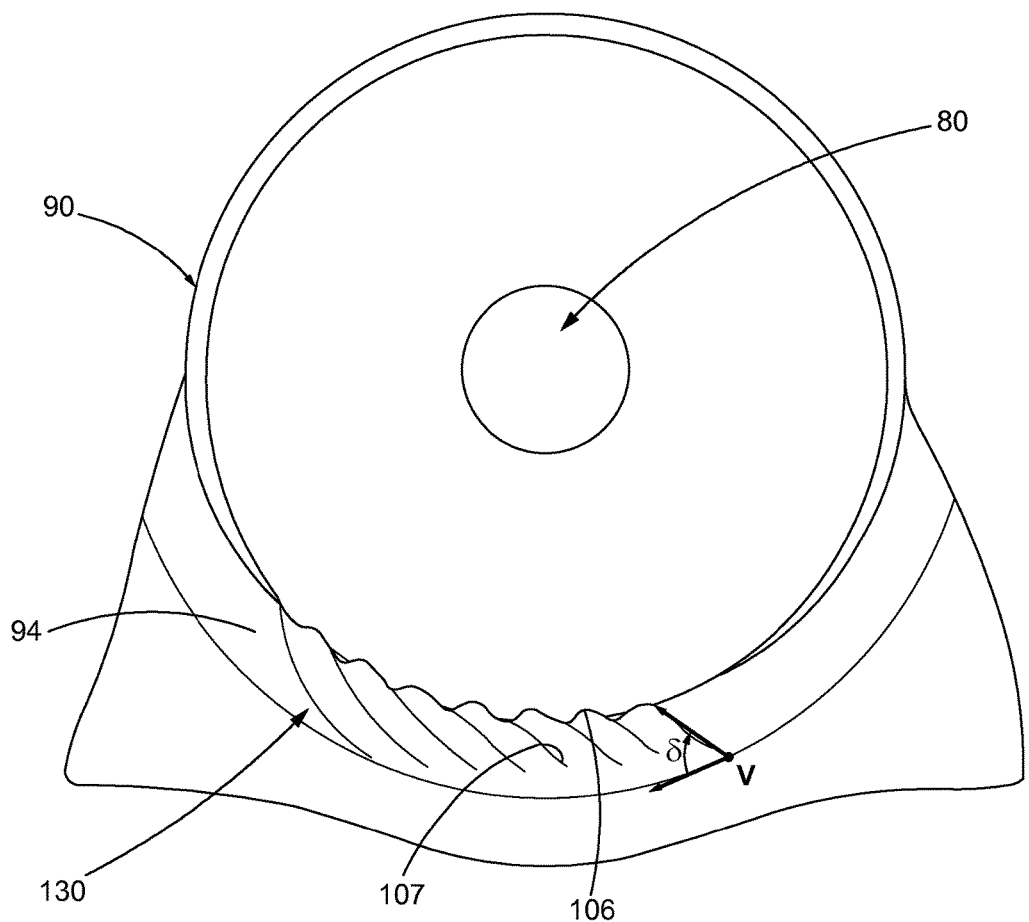
FIG. 8 diagrammatically illustrates an enlarged cut-away cross-sectional view of a portion of the fan case inner surface.

Each trough 107 may form a channel 140. Each peak 106 (and trough) may be disposed at an angle δ to the circumference of the fan inlet 92. FIG. 8 illustrates a diagrammatic cross-sectional view of a portion of the fan case 90. A portion of the inner surface 94 of the fan case 90 between the fan 42 and the fan inlet 92 is shown in order to illustrate the angle δ that each peak may form with the circumference of the fan inlet 92. In one embodiment the value of the angle δ may be in range of greater than 0° to about 45°. The quantity of channels 140 in the wavy portion may be in the range of 5 to 10 channels 140. The height $H_\lambda$ from peak 106 to trough 107 may be in the range of about 1% to about 5% of the diameter $D_F$ of the fan case 90 at the fan inlet 92 (FIG. 7). The wavelength λ from peak 106 to peak may be much smaller than the 1/rev distortion for increased fan tip stability. In an embodiment, the λ may be in the range of about 0.25 of the height $H_\lambda$ to about three times the height $H_\lambda$ from peak 106 to trough 107. The axial length $L_C$ of each channel may be about twice the axial cord $A_C$ measured at the tip of the blade 72.

The diameter $D_F$ of the fan case 90, in some embodiments, may decrease along the axial length $L_C$ of the wavy portion 130 in the fore to aft direction as illustrated in FIG. 6. The diameter $D_F$ of the fan case 90 at the wavy portion 130 is measured from the channel mean line 142 of the wavy portion 130 to the opposite inner surface 94 of the fan case 90. The channel mean line 142 is the approximate midpoint from peak 106 to trough 107, as best illustrated in FIG. 7.

In one embodiment, a portion of the fan case that immediately follows the wavy portion (the "end wall" 144) may be axisymmetric to accelerate the flow and reduce the momentum deficit. In some embodiments, the diameter $D_F$ (inner surface 94 to inner surface 94) of the circumference of the fan case in the axisymmetric portion may be the same or less than the diameter $D_F$ of the circumference of the fan case 90 along the axial length $L_C$ of the wavy portion 130.

Figure 9:
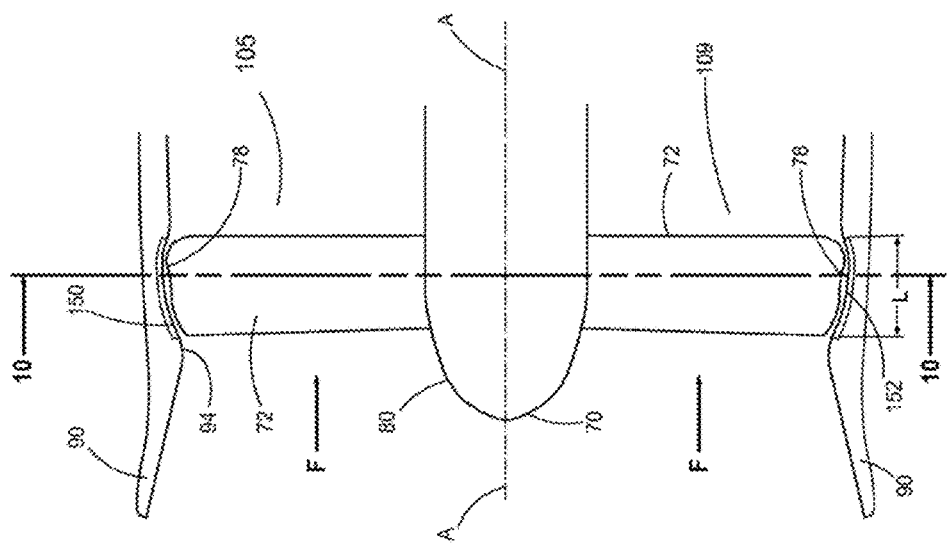
FIG. 9 diagrammatically illustrates an enlarged portion of the fan section of the gas turbine engine of FIG. 1.
Figure 10:
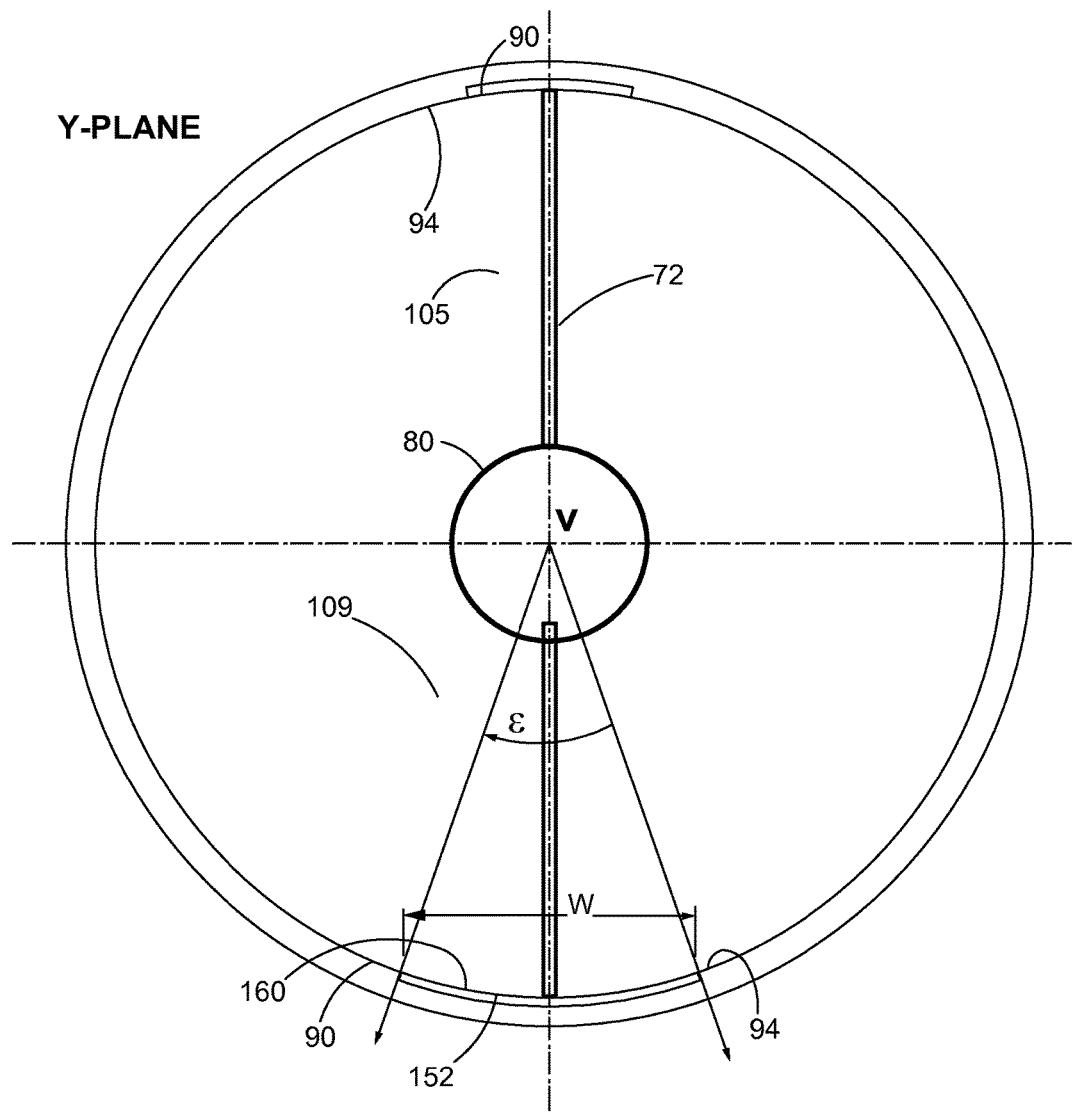
FIG. 10 diagrammatically illustrates a sectional view of the fan case and core case taken along the lines 10-10 of FIG. 9.

Turning now to FIG. 9, therein is diagrammatically illustrated an enlarged portion of the fan section 22 of the gas turbine engine 20 of FIG. 1 with exemplary contouring of the outer circumference of fan flow path F provided by a plurality of rub strips mounted on the inner surface 94 of the fan case 90. FIG. 10 diagrammatically illustrates a sectional view of the fan case 90 and core case 80 taken along the lines 10-10 of FIG. 9. In FIGS. 9-10, elements of the engine 20 except for a portion of the fan case 90, the core case 80, the inlet cone 70, and the fan blades 72 have been removed to better illustrate the exemplary rub strips 150, 152 described below. As can be seen in FIG. 9, the fan flow path F may include rub strips 150, 152 that result in the fan flow path F being non-axisymmetric about the central longitudinal axis A. The combination of rub strips 150, 152 helps to maintain a tight clearance between the fan tips 78 and the fan case 90 which reduces performance loss by minimizing leakage flow from one side of the fan blade 72 to the other through the gap between the tip 78 of the fan blade 72 and the inner surface 94 of the fan case 90.

As shown in FIGS. 9-10, the fan case 90 may include a first rub strip 150 and a second rub strip 152 each mounted on the inner surface 94. The first rub strip 150 may be disposed on the inner surface 94 of the fan case 90 in the upper half 105 of the fan flow path F, adjacent to the tip 78 of the fan blades 72. In some embodiments, the first rub strip 150 (FIGS. 9-10) may be generally centered at the top of the fan flow path F. In other embodiments, the first rub strip 150 may be centered elsewhere on a point located in the upper half 105 of the fan flow path F. Such positioning creates a smaller gap between the blade tip 78 and the inner surface 94 of the fan case 90.

The second rub strip 152 may be disposed on the inner surface 94 of the fan case 90 in the lower half 109 of the fan flow path F, adjacent to the tip 78 of the fan blades 72. In some embodiments, the second rub strip 152 (FIGS. 9-10) may be generally centered at the bottom of the fan flow path F. In other embodiments, the second rub strip 152 may be centered elsewhere on a point located in the lower half 109 of the fan flow path F. Such positioning creates a smaller gap between the blade tip 78 and the inner surface 94 of the fan case 90.

The material utilized for the first and second rub strips 150, 152 is determined by the material of the fan blade and the abraidability properties (for example, hardness) of the rub material.

The axial length L of the first and second rub strips 150, 152 may be in the range of about 1.0 times the axial chord $A_C$ of the fan blade 72 to about 1.2 times the axial chord $A_C$ of the fan blade 72. The axial length L of the each rub strip 150, 152 is measured on each rub strip 150, 152, fore to aft in a direction extending along the longitudinal axis A As seen in FIG. 10, the transverse width W across each rub strip 150, 152 is defined by an angle ε. The angle ε may have a value in a range of about 20° to about 90°. In another embodiment, the transverse width W may be defined by the angle ε having a value in a range of about 45° to about 120°. The angle ε having a vertex V disposed on the center longitudinal axis A, and its mouth generally disposed on the circumference or perimeter of the inner surface 94 of the fan case 90 cross section (as shown in FIG. 10). The angle ε is in the Y-plane shown in FIG. 10. The transverse width W across each rub strip 150, 152 may be thought of as spanning or covering the arc length 160 of the angle ε, although the transverse width W is measured in a generally straight line from a first side to the opposing second side at the base of the rub strip as illustrated in FIG. 10.

Figure 11:
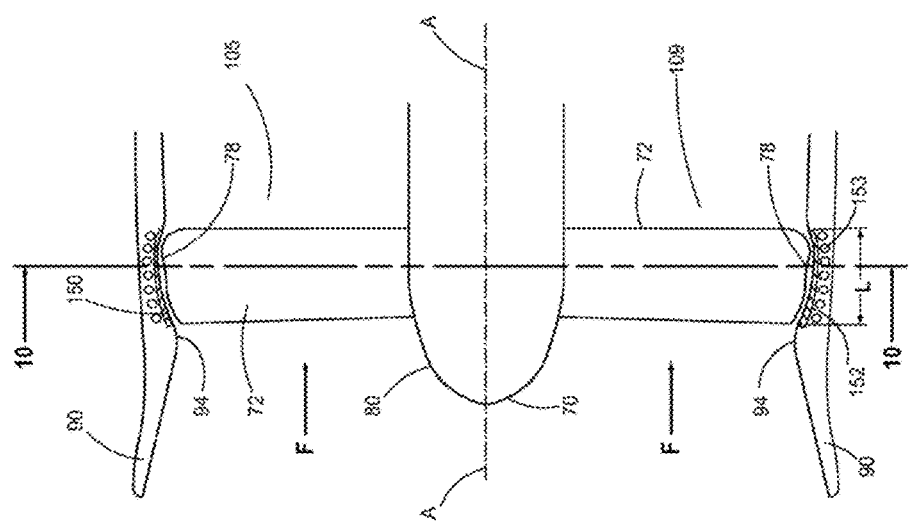
FIG. 11 diagrammatically illustrates an enlarged portion of the inner surface of the fan case of the gas turbine engine of FIG. 1.

Turning now to FIG. 11, therein is diagrammatically illustrated an embodiment of a flow path F that is made non-axisymmetric by control of the temperature of the im1er surface 94 of the fan case 90. FIG. 11 shows an enlarged portion of the fan section 22 of the gas turbine engine 20 of FIG. 1. Disposed in the inner surface 94 below an exemplary rub strip 152 are one or more temperature control elements 153. Such elements 153 may be heating coils, tubing through which hot or cold air is circulated, or the like. The contouring of the outer circumference of fan flow path F is provided by temperature control of the rub strips 150, 152 and/or the fan case 90 (proximal to the fan tips 78) during flight conditions. The temperature control elements 153 cause expansion or contraction of the inner surface 94 of the fan case 90 and/or the rub strips thereby allowing the tip gap between the blade tip 78 and the inner surface 94 of the fan case 90 to be controlled.

Also disclosed is a method of assembling a gas turbine propulsion system. The method may comprise defining a fan flow path by positioning a fan case around a fan and a portion of a core case of a gas turbine engine. The inner surface of the fan case and the outer surface of the core case define a bypass flow path disposed downstream of the fan and configured to receive air drawn in by the fan and to convey bypass airflow from the fan rearward. The fan flow path may extend from an entrance to the fan case, disposed before the fan, to the end of the bypass flow path. At least a portion of the fan flow path is non-axisymmetric immediately before or after the fan.

INDUSTRIAL APPLICABILITY

In general, the present disclosure may find applicability in increasing the stability margin associated with inlet total pressure and swirl distortions driven by static pressure non-uniformity and ingested voracity. Further benefits include radial redistribution of the aerodynamic loading in the fan flow path F near the outer surface of the core case and/or the inner surface of the fan case.

This may be achieved by introduction into the fan flow path of one or more of the following: perturbations, spoilers, wavy portion(s) of the inner surface of the fan case, and rub strips.

In operation, the fan 42 draws airflow into the fan inlet 92 and drives the airflow into the gas turbine engine core flow path C and into the bypass flow path B. In one embodiment, approximately 80 percent of the airflow entering the fan case 90 flows along the bypass flow path B. The bypass airflow is discharged from the gas turbine engine 20 through the rear exhaust outlet 96 disposed at the rear end of the fan case 90. The core airflow is discharged from a passage disposed adjacent to a tail cone 98 at the rear end of the core case 80.

Wavy portions of the inner surface of the fan case pre-rotate the airflow in the fan flow path and break up large-scale distortions into a series of smaller scale patterns with smaller time scales that improve the fan interaction with the incoming distorted air flow. This increases the fan tip region stability. It also places a tuned unsteadiness on top of the fan quasi-steady operating state that helps mitigate tip stall as the fan traverses through the distortion pattern.

As airflow moves over perturbations and/or spoilers disposed in the fan flow path favorable pressure gradients are created downstream and/or upstream of the fan blades. This leads to reduction in incoming pressure and/or circumferential and radial distortion.

What is claimed is:

1. A gas turbine engine disposed about a longitudinal axis, the engine comprising:
    a compressor; a turbine; a fan including a plurality of blades rotatable about the axis;
    a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
    a fan case that generally surrounds the fan blades and a portion of the core case, the fan case including a fan inlet and an inner surface, the fan inlet disposed upstream of the fan blades;
    a bypass flow path disposed downstream of the fan between the outer surface of the core case and the inner surface of the fan case, the bypass flow path configured to receive air drawn in by the fan through the fan inlet and to convey bypass airflow from the fan rearward; and
    a fan flow path that extends from the fan inlet to the rear exhaust outlet of the bypass flow path, wherein a portion of the fan flow path proximal to the fan is non-axisymmetric with respect to the axis, and
    wherein:
    the inner surface of the fan case includes a first perturbation downstream of and axially adjacent the fan; the outer surface of the core case includes a second perturbation downstream of and axially adjacent the fan; or the outer surface of the core case includes a third perturbation downstream of and axially adjacent the fan, wherein the third perturbation is a recess that extends inward into the core case.

2. A gas turbine engine disposed about a longitudinal axis, the engine comprising:
    a compressor; a turbine;
    a fan including a plurality of blades rotatable about the axis;
    a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
    a fan case that generally surrounds the fan blades and a portion of the core case, the fan case including a fan inlet and an inner surface, the fan inlet disposed upstream of the fan blades;
    a bypass flow path disposed downstream of the fan between the outer surface of the core case and the inner surface of the fan case, the bypass flow path configured to receive air drawn in by the fan through the fan inlet and to convey bypass airflow from the fan rearward; and
    a fan flow path that extends from the fan inlet to the rear exhaust outlet of the bypass flow path,
    wherein a portion of the fan flow path proximal to the fan is non-axisymmetric with respect to the axis, and
    wherein the inner surface of the fan case in an upper half of the bypass flow path includes a perturbation that is disposed downstream of the fan and that extends toward the core case opposite to the perturbation, the perturbation having generally sloping sides and a generally rounded peak.

3. The gas turbine engine of claim 2, wherein a transverse width of the perturbation is defined by an angle in a range of 5° to 40°, the angle having a vertex disposed on the axis.

4. The gas turbine engine of claim 3, wherein a height of the peak of the perturbation is 0.1 to 0.25 of the transverse width of the perturbation.

5. The gas turbine engine of claim 2, wherein an axial length of the perturbation is half of a blade axial chord to twice the blade axial chord.

6. The gas turbine engine of claim 2, wherein a height of the peak of the perturbation is 1 percent to 3 percent of a blade axial chord.

7. A gas turbine engine disposed about a longitudinal axis, the engine comprising:
    a compressor; a turbine;

a fan including a plurality of blades rotatable about the axis;
a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
a fan case that generally surrounds the fan blades and a portion of the core case, the fan case including a fan inlet and an inner surface, the fan inlet disposed upstream of the fan blades;
a bypass flow path disposed downstream of the fan between the outer surface of the core case and the inner surface of the fan case, the bypass flow path configured to receive air drawn in by the fan through the fan inlet and to convey bypass airflow from the fan rearward; and
a fan flow path that extends from the fan inlet to the rear exhaust outlet of the bypass flow path,
wherein a portion of the fan flow path proximal to the fan is non-axisymmetric with respect to the axis, and
wherein the outer surface of the core case includes a perturbation that is disposed in an upper half of the fan flow path
downstream of the fan and before the core inlet, and extends toward the fan case opposite to the perturbation, the perturbation having generally sloping sides and a generally rounded peak.

8. The gas turbine engine of claim 7, wherein a transverse width of the perturbation is defined by an angle in a range of 5° to 100°, the angle having a vertex disposed on the axis.

9. A gas turbine engine disposed about a longitudinal axis, the engine comprising:
a compressor; a turbine;
a fan including a plurality of blades rotatable about the axis;
a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
a fan case that generally surrounds the fan blades and a portion of the core case, the fan case including a fan inlet and an inner surface, the fan inlet disposed upstream of the fan blades;
a bypass flow path disposed downstream of the fan between the outer surface of the core case and the inner surface of the fan case, the bypass flow path configured to receive air drawn in by the fan through the fan inlet and to convey bypass airflow from the fan rearward; and
a fan flow path that extends from the fan inlet to the rear exhaust outlet of the bypass flow path,
wherein a portion of the fan flow path proximal to the fan is non-axisymmetric with respect to the axis, and
wherein the outer surface of the core case in a lower half of the fan flow path includes a perturbation that is disposed downstream of the fan and before the core inlet, and extends inward, the perturbation having generally sloping sides and a generally rounded trough.

10. A gas turbine engine disposed about a longitudinal axis, the engine comprising:
a compressor; a turbine;
a fan including a plurality of blades rotatable about the axis;
a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
a fan case that generally surrounds the fan blades and a portion of the core case, the fan case including a fan inlet and an inner surface, the fan inlet disposed upstream of the fan blades;
a bypass flow path disposed downstream of the fan between the outer surface of the core case and the inner surface of the fan case, the bypass flow path configured to receive air drawn in by the fan through the fan inlet and to convey bypass airflow from the fan rearward; and
a fan flow path that extends from the fan inlet to the rear exhaust outlet of the bypass flow path,
wherein a portion of the fan flow path proximal to the fan is non-axisymmetric with respect to the axis, and
wherein the inner surface of the fan case includes a spoiler that is disposed downstream of the fan, the spoiler moveable between a closed position and an open position in which the spoiler extends into the bypass flow path at a spoiler angle, the spoiler angle in a range of 5° to 40°.

11. A gas turbine engine disposed about a longitudinal axis, the engine comprising:
a compressor; a turbine;
a fan including a plurality of blades rotatable about the axis;
a core case that extends rearward from the fan along the axis and generally surrounds the compressor and the turbine, the core case including an outer surface, a core inlet and a core flow path disposed within the core case, the core flow path configured to receive airflow from the fan and to convey the airflow to the compressor, the core inlet disposed at an entrance to the core flow path;
a fan case that generally surrounds the fan blades and a portion of the core case, the fan case including a fan inlet and an inner surface, the fan inlet disposed upstream of the fan blades;
a bypass flow path disposed downstream of the fan between the outer surface of the core case and the inner surface of the fan case, the bypass flow path configured to receive air drawn in by the fan through the fan inlet and to convey bypass airflow from the fan rearward; and
a fan flow path that extends from the fan inlet to the rear exhaust outlet of the bypass flow path,
wherein a portion of the fan flow path proximal to the fan is non-axisymmetric with respect to the axis, and
wherein the outer surface of the core case includes a spoiler that is disposed downstream of the fan and before the core inlet, the spoiler moveable between a closed position and an open position in which the spoiler extends into the bypass flow path at a spoiler angle, the spoiler angle in a range of 5° to 60°.

12. A method of assembling a gas turbine propulsion system, the method comprising:
defining a fan flow path by positioning a fan case around a fan and a portion of a core case of a gas turbine engine, the inner surface of the fan case and the outer surface of the core case defining a bypass flow path, the bypass flow path disposed downstream of the fan and configured to receive air drawn in by the fan and to convey bypass airflow from the fan rearward, the fan flow path extending from an entrance to the fan case disposed before the fan to the end of the bypass flow path, wherein at least a portion of the fan flow path is non-axisymmetric immediately before or after the fan; and wherein:

the inner surface of the fan case includes a first perturbation downstream of and axially adjacent the fan; the outer surface of the core case includes a second perturbation downstream of and axially adjacent the fan; or the outer surface of the core case includes a third perturbation downstream of and axially adjacent the fan, wherein the third perturbation is a recess that extends inward into the core case.

\* \* \* \* \*